United States Patent [19]

Anderson

[11] 4,153,133
[45] May 8, 1979

[54] STEERING TRAVEL LIMITER FOR POWER STEERING GEAR
[75] Inventor: Stanley E. Anderson, Saginaw, Mich.
[73] Assignee: General Motors Corporation, Detroit, Mich.
[21] Appl. No.: 854,710
[22] Filed: Nov. 25, 1977
[51] Int. Cl.² .............................................. G62D 5/06
[52] U.S. Cl. ...................................... 180/154; 74/526
[58] Field of Search ................... 180/78, 79, 132, 146, 180/154; 74/526, 499; 91/375 A; 417/440

[56] References Cited
U.S. PATENT DOCUMENTS

| | | | |
|---|---|---|---|
| 2,911,850 | 11/1959 | Schmidt | 74/526 |
| 3,253,548 | 5/1966 | Zeigler | 417/440 |
| 4,009,641 | 3/1977 | Rohde et al. | 91/375 A |

Primary Examiner—Joseph F. Peters, Jr.
Assistant Examiner—R. Schrecengost
Attorney, Agent, or Firm—Charles R. White

[57] ABSTRACT

This power steering gear has steering travel limiter for controlling the input rotation so that the hydraulic valve of the gear cannot be moved to a closed position previously established by contact of the wheel stop or internal stop in the gear. The limiter in the preferred embodiment employs a series of rings which are engaged in series in response to handwheel input and which prevent rotation of the input beyond a certain point at or inboard of internal stops or the wheel stops so that the valving of the gear cannot close to a point requiring the power steering pump to operate in relief.

4 Claims, 7 Drawing Figures

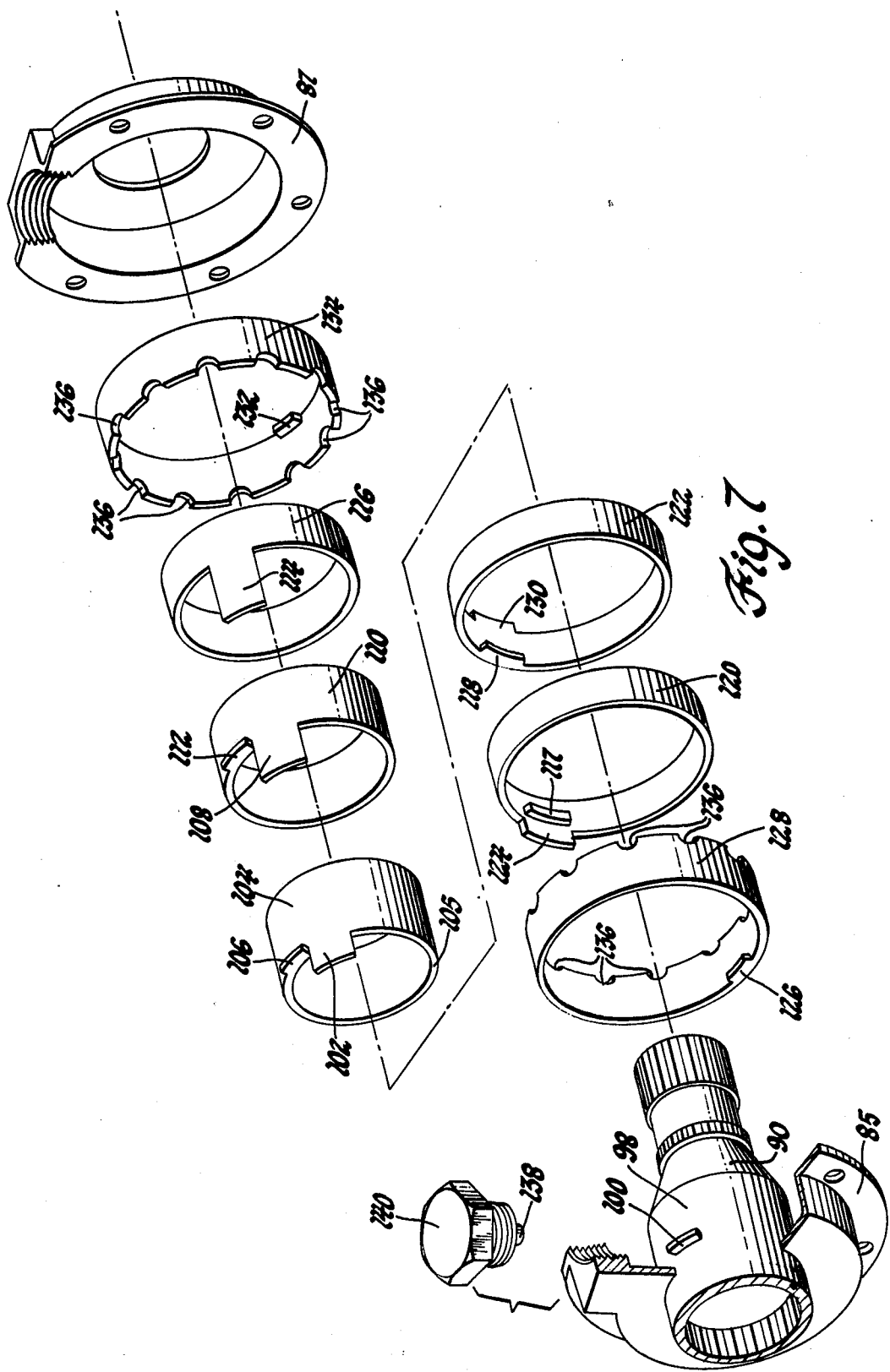

STEERING TRAVEL LIMITER FOR POWER STEERING GEAR

BACKGROUND OF THE INVENTION

1. Field of the Invention

This invention relates to power steering gears and more particularly to a steering limiter coupled to the input of a power steering gear to establish left and right turn limit stops to prevent engagement of the dirigible wheels with their stops and thereby avoid closing of the power steering gear valve and resulting operation of the power steering pump in relief.

2. Description of the Prior Art

Power steering systems generally incorporate engine driven hydraulic pumps which supply pressure fluid to the open center valves of the power steering gears. To increase pump service life, relief valving is provided in the pump to limit pump output pressure. However, if the flow of oil from the pump remains blocked for some time, as when the dirigible wheels of the vehicle are steered against their wheel stops, curbing or deep sand or mud, continued operation in pump relief may result in pump overload with higher fluid temperatures and reduced pump service life.

Prior to the present invention, some power steering gears incorporated internal relief valve constructions which were actuated as the steering approached wheel stop or internal stop of the gear to prevent full lock power steering and resulting operation of the pump in pressure relief. While such pump saver devices have provided benefits in the power steering field, particularly in working vehicles such as gravel pit trucks which frequently operate in a full lock power steering situation, they are relatively complex and expensive. The pump saver devices internal of the gear add to cost and complexity of the gear. with these devices, there is the possibility of reduction of steering assist due to inadequate sealing or seating of the unloading valve or external leakage past the seals on the threaded adjusters for such devices.

SUMMARY OF THE INVENTION

This invention is directed toward a steering travel limiter on the input side of the power steering gear as opposed to the outboard side as represented by the wheel stop or internal stops within the gear as found in many prior art constructions. The basic approach of this invention is to provide the sequential engagement of a plurality of rotating members until a final rotating member contacts a final stop which preferably is adjustable to limit steering travel. These members are preferably rings mounted in a housing which is grounded to one of the side rails of the vehicle frame. This housing surrounds a cylindrical drive tube drivingly connecting the steering shaft to the stub shaft of the power steering gear. The rings of this invention are rotatably mounted in the housing and, as the drive tube is rotated by manual rotation of the handwheel, are sequentially picked up and rotated in the direction of input rotation. At the end of the steering travel as the dirigible wheels approach their wheel stops or the piston nut approaches its stop, the final ring will contact a stop member to prevent the hydraulic valve of the power steering gear from being rotated by the handwheel to a closed position in which the pump operates in relief.

With the input stop limiting steering input just inside of the limits established by the wheel stops or by internal stops in the steering gear, the valve of the steering gear will be held in an adjusted position so that the pump output pressures and oil temperatures are not sufficiently high to cause pump failure.

The invention incorporates an adjustable stop for controlling the amount of steering travel. Preferably, two final stop rings mounted side by side provide stop adjustment by manual rotation through an external access port in the housing of the steering limiter. A screw normally closes the access port and holds the stop rings in adjusted position. The rings are independently adjustable to allow unequal travel between left and right steering so that operators are able to change and use different sized tires for left and right dirigible wheels. With the travel input on the input side of the steering gear rather than on the outboard side, loads on such devices and the steering linkage are usually limited to torques manually applied at the handwheel. With this invention, steering gear complexity is not increased and the potential for internal or external fluid leakage is minimized. Cost reductions are achieved and there is long service life with this invention. In case of failure of the limiter of this invention, steering would not be affected since only extended steering travel to the gear stop or wheel stop with associated pump relief could occur.

DESCRIPTION OF THE DRAWINGS

FIG. 7 is an exploded perspective view of the steering travel limiter assembly of this invention.

Turning now in greater detail to the drawings, FIG. 1 illustrates a power steering system for the dirigible wheels 10 and 12 of a vehicle comprising a steering shaft 14 manually turned by a vehicle operator through a conventional handwheel, not shown. The steering shaft 14 is drivingly connected to a power steering gear 16 through a conventional flexible coupling 18 and a special steering travel limiter or adjuster assembly 20 to which this invention is directed and which accordingly will be described in greater detail below.

Figure 1:
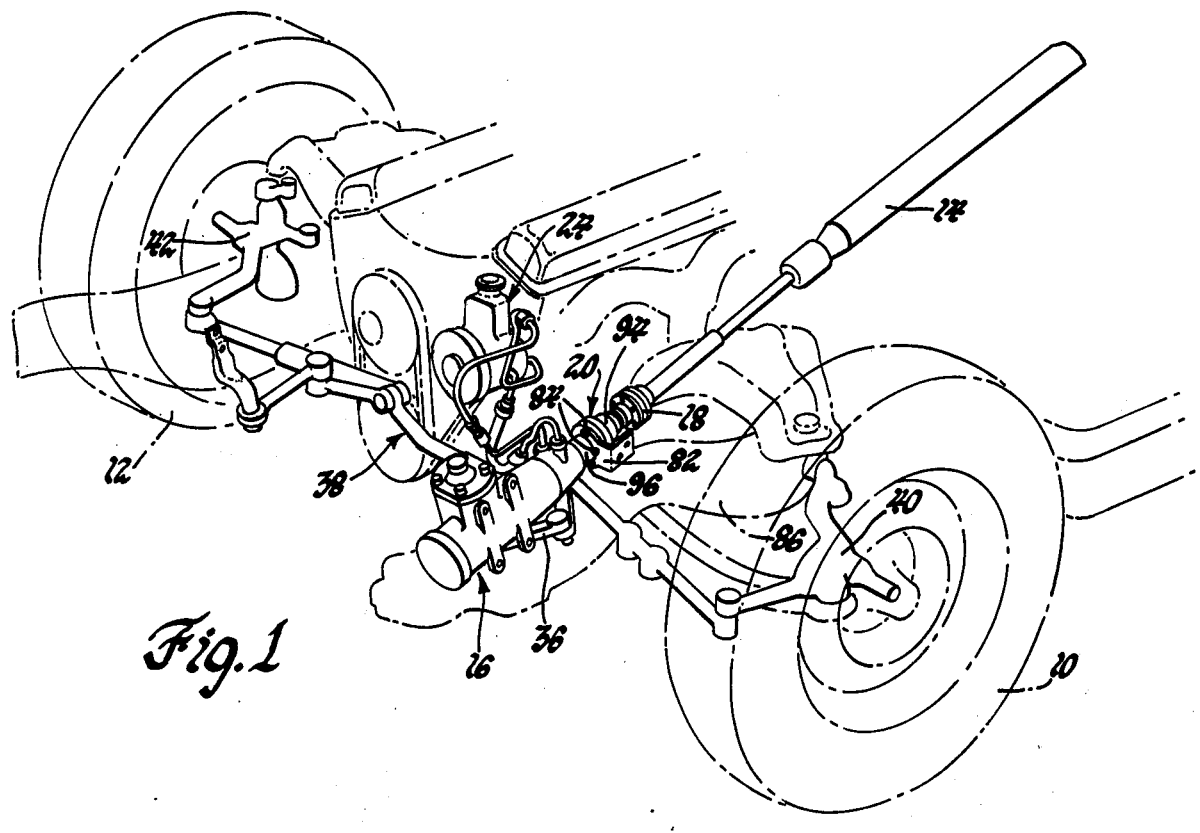
FIG. 1 is a perspective view of a power steering system of a vehicle incorporating this invention.
Figure 2:
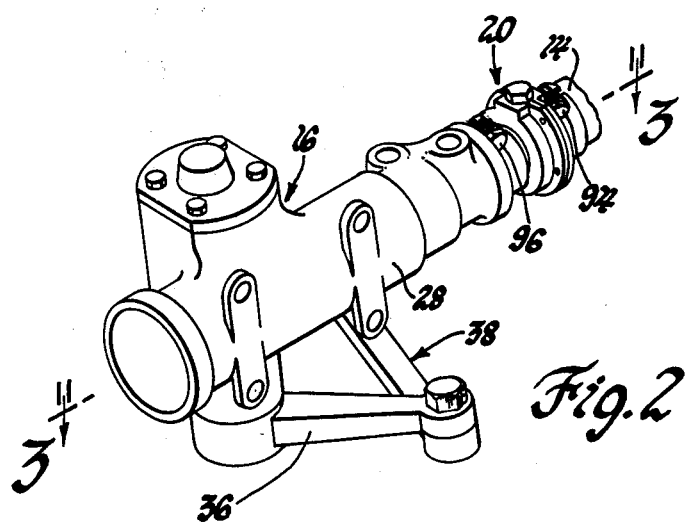
FIG. 2 is a perspective view of the power steering gear and the steering travel limiter assembly of the system of FIG. 1.

The power steering gear is preferably an integral power gear such as is shown and described in U.S. Pat. No. 4,009,641 to Robert P. Rohde et al. issued Mar. 1, 1977 for "Compact Power Steering Gear" whose disclosure is hereby incorporated by reference. The power gear is supplied with pressure fluid from an engine driven fluid pump 24 and incorporates a piston nut 26 which is slidably mounted in the housing 28 of the power steering gear and cooperates therewith to form separate hydraulic chambers 30 and 32. The piston nut 26 has rack teeth meshing with the teeth of the pitman shaft sector gear 34. The sector gear is drivingly connected through its shaft to a pitman arm 36 of a steering linkage 38 such as that shown and described in U.S. Pat. No. 4,093,388 issued June 6, 1978 by Robert I. MacArthur for "Tie Rod Assembly for Vehicles" which is hereby incorporated by reference. The linkage 38 is drivingly connected to left and right steering knuckles 40 and 42 which are pivotally supported on corresponding upper and lower control arms of the vehicle suspension. The road wheels 10 and 12 are rotatably supported on the spindles of the steering knuckles in a conventional mannner.

The power steering gear 16 has a stub shaft 44 that extends into one end of the housing 28 and is rotatably driven by the output of the steering travel adjuster assembly 20. The stub shaft 44 is drivingly connected through a suitable lost motion connection as described in the Rohde et al. patent cited above to the elongated rotatable screw 46 which is threaded through the piston nut 26 and is supported on the adjuster plug in the lower end of the housing by thrust bearing assembly 47. When the lost motion has been taken up, handwheel input into the stub shaft will turn the screw to effect linear movement of the piston nut 26 in the housing. This action turns pitman shaft gear sector 34 which operates the pitman arm and the connected steering linkage for appropriately steering the vehicle. As is well known in this art, the mechanical steering serves as a backup to the hydraulic power capability of the steering gear 16.

As shown, the stub shaft 44 of the steering gear has a torsion bar 50 extending longitudinally therethrough which is pinned at its outboard end to the stub shaft 44. The inboard end of the torsion bar is pinned to a torsion bar cap 52. The torsion bar cap nests within and is pinned to one end of the valve body 54 of a rotary hydraulic control valve 56. Valve body 54 is concentric with a cylindrical valve spool 58 which is pinned to and rotates with the stub shaft 44. The construction and operation of the power steering gear are only briefly described here, there being a fuller description in the referenced patent to Rohde et al.

The control valve 56 is supplied with pressure fluid from the pump 24 through a pressure hose and inlet passage 62. Power steering fluid is returned to the pump through the discharge passage 64 in housing 28 and the return hose that connects this passage to the sump of the pump. The rotary valve 56 is an open center valve which controls the supply and exhaust of fluid to and from the piston nut for power actuation of the piston nut for left and right turn power steering. When the vehicle steering is conditioned for straight ahead operation, the valve is in its fully open position and, experiencing no handwheel input, is centered by the torsion bar.

For right and left power steered turns the valve is rotated from an open position to a partially closed position by handwheel input. Thus, with steering resistance experienced by the gear sector, and with rotary steering input into the stub shaft, the torsion bar is deflected and the valve body and spool are relatively rotated. With the valve assembly being moved to an unbalanced partially closed position, the pump pressure increases as one of the chambers 30 or 32 is supplied with pressure fluid while the other is opened to exhaust. Assuming a right corner is being negotiated, a pressure differential is established across piston nut 26 which is then hydraulically powered in transitory movement to the right in housing 28 to overcome steering resistance and to turn the gear sector 34 to effect powered steering of the vehicle. Under such circumstances, power steering oil is circulated in the system. However, oil pressure is not increased to a point where the pump extensively operates in relief to detract from pump service life.

On termination of steering effort, the torsion bar centers the valve body and spool so that oil pressure is again equal on both sides of the piston nut. When the handwheel is released, the steering geometry of the vehicle causes the dirigible wheels to return to the straight ahead position.

Figure 3:
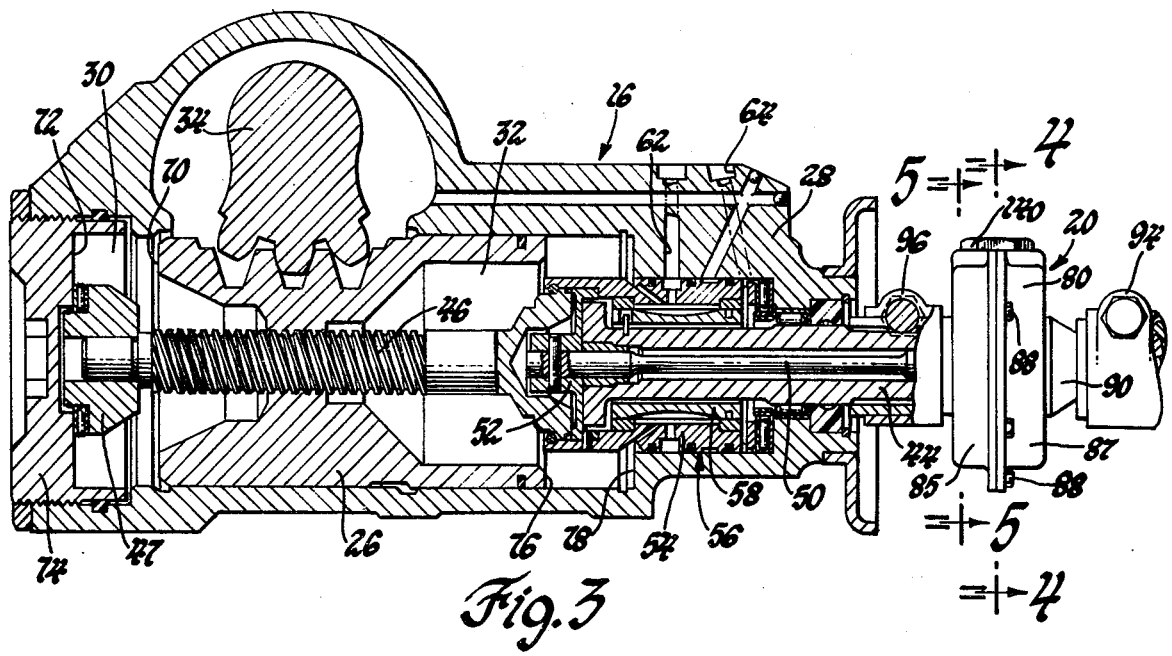
FIG. 3 is a view of the power steering gear and steering travel limiter assembly of FIG. 1 taken along lines 3—3 of FIG. 2.

Conventionally, power steering gears such as gear 16 have provisions for limiting travel of the piston nut in either direction. Leftward travel in viewing FIG. 3 is limited by contact of an end face 70 of the piston nut with a contact surface 72 of the adjuster plug 74. Travel to the right for maximum right turn steering is limited by contact of the upper end face 76 of the piston nut with the radial shoulder 78 of housing 28. In addition to the internal limit stops within the gear, vehicle steering systems generally include wheel stops, not shown in these drawings, that limit the turning angle of the dirigible wheels of the vehicle.

Many working-type vehicles such as trucks used in gravel pit operations spend considerable time with the steering in full lock. In full lock steering, the internal stop of the power steering gear is engaged by the piston nut or the wheel stops are engaged by the dirigible wheels of the vehicle. Under such conditions, the valve 56 would be fully closed so that a high pressure is built up in the system with little or no fluid circulation therein so that the pump operates in relief. While such relief operation provides for overload protection, extended closed valve operation will frequently result in overheating of the pump which severely limits its service life. In addition to detracting from service life of the pump, the large steering effort produced by the power steering pump and directed against the wheel stops will subject the steering linkage and gear components to stresses which detracts from their service life.

In this invention, the above mentioned problems of the prior power steering systems are solved by incorporating a special travel limit device on the input side of the steering gear so that the loads at the limit stop positions are limited to manual torques applied at the handwheel. With this invention, there is no need to change designs of the steering gear to add unloading valve or other arrangement internal of the gear or of the pump which may be the same as that shown and described in U.S. Pat. No. 3,253,548 issued May 31, 1966 to Ziegler et al. hereby incorporated by reference.

The steering travel adjuster assembly 20 of this invention limits rotation of the stub shaft so that the piston nut 26 of FIG. 3 can move laterally to left and right positions closely adjacent to, but not into contact with, the internal stops of the power steering gear or to a position closely adjacent to the positions established by left and right wheel stops. This avoids the conditioning of the valve to the fully closed position in which the power steering gear pump operates in relief. The travel adjuster assembly 20 comprises a cylindrical housing 80 that is secured to bracket 82 by threaded fasteners 84. The bracket is in turn secured to framework 86 of the vehicle by additional threaded fastener, not shown. The housing is generally cylindrical and is formed by identical halves 85 and 87 connected at peripheral flanges by bolts 88. Extending axially through the fixed housing is a rotatable cylindrical drive tube 90 which is drivingly connected to the steering shaft 14 downstream of the flexible coupling 18 by connector sleeve and pinch bolt assembly 94. The lower end of the cylindrical drive tube fits over the outboard end of the stub shaft 44 and is drivingly connected thereto by clamping sleeve and pinch bolt assembly 96. With the construction described, the drive tube 90 is drivingly connected to the power steering gear so that rotatable handwheel input will turn the power steering gear stub shaft to condition the power steering gear for power assisted steering operation or for manual steering.

Figure 4:
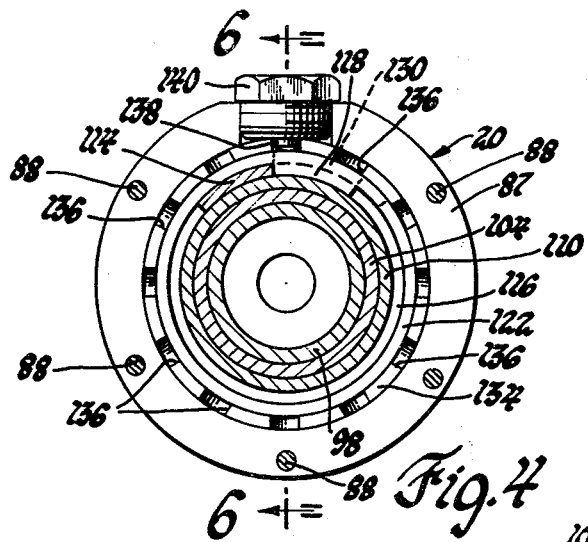
FIG. 4 is a sectional view of the steering travel limiter assembly of this invention taken along lines 4—4 of FIG. 3.
Figure 5:
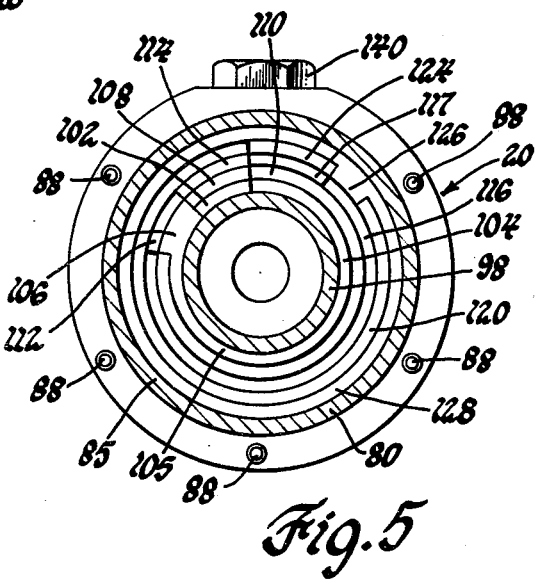
FIG. 5 is a sectional view taken along lines 5—5 of FIG. 3.
Figure 6:
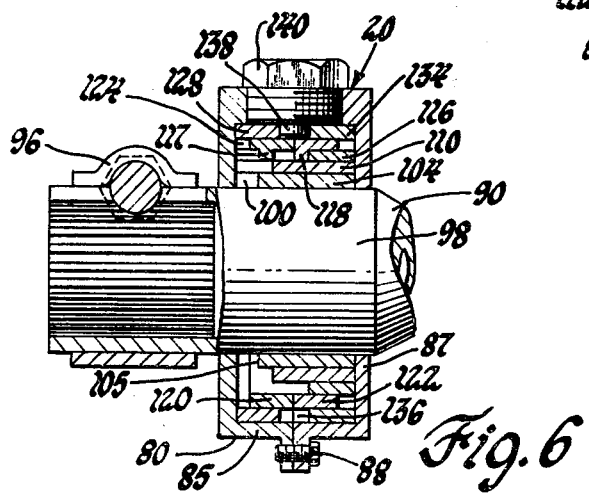
FIG. 6 is a veiw partly in cross section of the steering travel limiter assembly taken along lines 6—6 of FIG. 4.

The drive tube 90 has a cylindrical midportion 98 on which a plurality of concentric and sequentially engageable rings to limit steering input are rotatably mounted. Additionally, the central midportion of the tube has an outwardly extending radial drive lug 100 that is adapted to selectively engage either side of a lug contact finger 102 projecting longitudinally outwardly of a first pickup ring 104. The first pickup ring 104, rotatably mounted on the midportion of drive tube, has an end wall 105 disposed against lug 100 and a lug 106 extending radially outwardly therefrom. Lug 106 is adapted to selectively contact the sides of contact finger 108 extending longitudinally from the cylindrical wall of a second pickup ring 110. The second pickup ring is sized to rotatably fit on ring 104 and endwise against lug 106. This ring has a radial lug 112 which is adapted to selectively contact either side of a contact finger 114 of a third pickup ring 116. The third pickup ring 116 rotatably fits on second ring 110 and against lug 112. The contact finger 114 is adapted to engage the internal extending drive lugs 117 and 118 of a pair of final drive rings 120 and 122 which are concentric with and which are mounted for rotation within a pair of stop rings located in the housing 80. Final drive ring 120 has an axially extending finger 124 which is adapted to engage the inwardly extending stop lug 126 of an adjustable stop ring 128. Final drive ring 122 has an axially extending finger 130 that is adapted to engage the stop lug 132 on an adjustable stop ring 134. As best shown in FIGS. 4 and 6, the adjustable stop rings 128 and 134 are located in a side by side relationship and form a stop cylinder having a series of arcuately spaced openings 136 which are selectively engaged by the projecting tip 138 of an adjustment screw 140 which is threaded for radial movement with respect to the housing 80. With the tip 138 of the screw engaged in a selected one of the annular openings 136, the stop rings are fixed in position to limit input travel of the drive tube. By turning the screw counterclockwise, and moving it radially outwardly, both stop rings 128 and 134 may be simultaneously adjusted or either ring adjusted to change the position of the final stop members 132 and 126 so that the limits of the rotational travel of the input can be varied according to requirements.

With such separate adjustment, the steering travel in one direction can be greater or less than the steering travel in the opposite direction. With this provision, an operator will be able to install various size tires on his vehicle and operate it in conditions requiring unequal travel of the dirigible wheels in right and left turn steering.

Assuming right turn steering is initiated by the operator, the drive tube 98 will be rotated in a clockwise direction by handwheel input from the vehicle operator. As viewed from the gear side of the adjuster assembly in FIG. 7, the rotation would be counterclockwise. After predetermined right turn rotation of the tube 98, lug 100 will move into contact with the side of finger 102 of ring 104. Ring 104 will then be rotated with the drive tube and lug 106 will be rotated into contact with the finger 108 of ring 110. Ring 110 will then rotate with ring 104 and its lug will be rotated into contact with the finger 114 of ring 116. Ring 116 will then rotate with rings 104 and 110 and its finger 114 will contact lugs 117 and 118 of final drive rings 120 and 122. The rings will then pick up rotation until stop 126 is engaged by finger 124 at which point there can be no further right turn manual input into the power steering gear. This prevents the steering gear from being conditioned for full lock steering with closed valve and pump relief operation. The rings permit a plurality of turns from stop to stop so that effective steering is available at all times. The finger 130 of final drive ring 122 is used to engage the stop 132 to limit left turn steering and the operation will be the opposite to that described for right turn steering.

While a preferred embodiment of the invention has been shown and described to illustrate a preferred embodiment, other embodiments will become apparent to those skilled in the art. Accordingly, the limits of this invention are defined in the following claims.

What is claimed is:

1. A power steering system for a vehicle having dirigible wheels comprising a manually rotatable steering shaft, a power steering gear, a housing for said power steering gear, rotatable input means extending into said housing and movable in clockwise or counterclockwise directions for right and left turn steering, output means extending from said housing, linkage means drivingly connecting said output means to the dirigible wheels of the vehicle, a power steering pump having pressure relief valve means therein for supplying pressure fluid for said system, hydraulically operated piston means mounted in said housing and operatively connected to said output means for the hydraulic drive of said output means, hydraulic control valve means disposed within said housing hydraulically connected to said pump and said piston means, said valve means comprising valve spool means operatively connected to said input means and a valve body operatively connected to said connector means, said valve spool means being rotatably positioned relative to said valve body in response to manual rotation of said input means to partially close said valve means and condition said piston means for power assist drive of said output, and travel limiter means operatively connected to said input means of said power steering gear external of said housing to establish right and left turn stop positions of said input shaft to prevent said valve body and valve spool from being moved to a closed position and said pump from operating in pressure relief, said travel limiter means comprising: a drive tube drivingly interconnecting said steering shaft and said input means of said power steering gear, a plurality of concentric and sequentially engageable stop ring means mounted on and driven by said drive tube, and fixed stop means for engaging the outer most of said stop ring means for limiting clockwise and counterclockwise rotation of said drive tube and thereby corresponding rotation of said steering shaft and input means of said power steering gear.

2. A power steering system for a vehicle having dirigible wheels comprising a manually rotatable steering shaft, a power steering gear, a housing for said power steering gear, a rotatable input shaft extending into said housing and movable in clockwise or counterclockwise directions for right and left turn steering, output means extending from said housing, linkage means drivingly connecting said output means to the dirigible wheels of the vehicle, connector means operatively connecting said input shaft to said output means to permit said input shaft to mechanically drive said output means in response to rotation of said input shaft, a power steering pump having pressure relief means therein for supplying pressure fluid for said system, said connector means including hydraulically operated piston means mounted in said housing and drivingly connected to said output means for the hydraulic drive of said output means, hydraulic control valve means disposed within said housing hydraulically connected to said pump and said piston means, said valve means comprising valve spool means operatively connected to said input shaft and a valve body operatively connected to said connector means, said valve spool means being rotatably positioned relative to said valve body in response to manual rotation of said input shaft to partially close said valve means and condition said piston means for power assist drive of said output, and travel limiter means operatively connected to said input shaft of said power steering gear external of said housing to establish right and left turn stop positions of said input shaft to prevent said valve body and valve spool from being moved to a closed position and said pump from operating in pressure relief, said travel limiter means comprising a drive tube drivingly interconnecting said steering shaft and said input means of said power steering gear, a plurality of concentric and sequentially engageable stop ring means mounted on and driven by said drive tube, and fixed stop means concentric with said sequentially engageable stop ring means for engaging the outer most of said stop ring means after predetermined rotation of said drive tube in either direction for limiting corresponding rotation of said steering shaft and said input means of said steering gear.

3. A power steering system for a vehicle having dirigible wheels comprising a manually rotatable steering shaft, a power steering gear, a housing for said power steering gear, a rotatable input shaft extending into said housing and movable in clockwise or counterclockwise directions for right and left turn steering, output means extending from said housing, linkage means drivingly connecting said output means to the dirigible wheels of the vehicle, connector means operatively connecting said input shaft to said output means to permit said input shaft to mechanically drive said output means in response to rotation of said input means, a power steering pump having a pressure relief valve therein for supplying pressure fluid for said system, said connector means including hydraulically operated piston means mounted in said housing and drivingly connected to said output means for the hydraulic drive of said output means, first stop means for limiting travel of said piston means to establish the outer limits of steering travel of the dirigible wheels of the vehicle, hydraulic control valve means disposed within said housing hydraulically connected to said pump and said piston means, said valve means comprising valve spool means operatively connected to said input shaft and a valve body operatively connected to said connector means, said valve spool means being rotatably positioned relative to said valve body in response to manual rotation of said input shaft to partially close said valve means and condition said piston means for power assist drive of said output, and travel limiter means to establish right and left turn stop positions of said input shaft and within the limits of steering travel of said dirigible wheels of said vehicle as established by said first stop means to prevent said valve body and valve spool from being moved to a closed position and said pump from operating in pressure relief, said travel limiter means comprising a drive tube drivingly interconnecting said steering shaft and said input means so that said steering shaft can turn said input means, a casing fixed in said vehicle surrounding said drive tube, a plurality of concentric and sequentially engageable stop ring means mounted in said casing and rotatably driven by said drive tube, and fixed stop means fixedly mounted in said casing concentric with said plurality of stop ring means for engaging one of said stop ring means after predetermined clockwise rotation of said drive tube to limit clockwise rotation of said input means and another of said stop ring means after predetermined counterclockwise rotation of said drive tube to limit counterclockwise rotation of said input means.

4. A power steering system for a vehicle having dirigible wheels comprising a power steering gear, a housing for said power steering gear, a rotatable input shaft extending into said housing and movable in clockwise or counterclockwise directions for right and left turn steering, output means extending from said housing, linkage means drivingly connecting said output means to the dirigible wheels of the vehicle, connector means operatively connecting said input shaft to said output means to permit said input shaft to mechanically drive said output means in response to rotation of said input means, a power steering pump having a pressure relief valve therein for supplying pressure fluid for said system, said connector means including hydraulically operated piston means mounted in said housing and drivingly connected to said output means for the hydraulic drive of said output means, first stop means for limiting travel of said piston means to establish the outer limits of steering travel of the dirigible wheels of the vehicle, hydraulic control valve means disposed within said housing hydraulically connected to said pump and said piston means, said valve means comprising valve spool means operatively connected to said input shaft and a valve body operatively connected to said connector means, said valve spool means being rotatably positioned relative to said valve body in response to manual rotation of said input shaft to partially close said valve means and condition said piston means for power assist steering, drive means secured to said input shaft, travel limiter means comprising a housing disposed around said drive means, fastener means for holding said housing stationary, a plurality of concentric rings mounted in said housing on said drive means, said drive means having contact means for driving a first of said rings, said first ring having contact means for driving a second of said rings after predetermined rotation of said drive means, and means within said housing for limiting rotation of said rings and said drive shaft and within the limits of steering travel of said dirigible wheels of said vehicle as established by said first stop means to prevent said valve body and valve spool from being moved to a closed position and said pump from operating in pressure relief.

* * * * *